US011503548B2

(12) United States Patent
Pei et al.

(10) Patent No.: US 11,503,548 B2
(45) Date of Patent: Nov. 15, 2022

(54) TRANSMISSION POWER DETERMINATION FOR AN ANTENNA ARRAY (71) Applicant: Telefonaktiebolaget LM Ericsson (PUBL), Stockholm (SE)

(72) Inventors: Yali Pei, Beijing (CN); Jonas Karlsson, Upplands Väsby (SE); Torbjörn Wigren, Uppsala (SE); Yuan Wang, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/283,459

(22) PCT Filed: Oct. 8, 2018

(86) PCT No.: PCT/CN2018/109263
§ 371 (c)(1),
(2) Date: Apr. 7, 2021

(87) PCT Pub. No.: WO2020/073148
PCT Pub. Date: Apr. 16, 2020

(65) Prior Publication Data
US 2021/0345252 A1 Nov. 4, 2021

(51) Int. Cl.
*H04W 52/06* (2009.01)
*H04B 7/06* (2006.01)
(Continued)

(52) U.S. Cl.
CPC .......... *H04W 52/06* (2013.01); *H04B 7/0452* (2013.01); *H04B 7/0617* (2013.01); *H04W 52/22* (2013.01)

(58) Field of Classification Search
CPC ... H04W 52/06; H04W 52/223; H04W 52/42; H04W 52/225; H04B 7/0617; Y02D 30/70
See application file for complete search history.

(56) References Cited

U.S. PATENT DOCUMENTS 5,808,913 A * 9/1998 Choi .................... H01Q 3/2611
704/226
9,674,793 B2 * 6/2017 Okmyanskiy ....... H04W 52/245
(Continued)

FOREIGN PATENT DOCUMENTS

CN         1658530 A      8/2005
CN       101860391 A     10/2010
(Continued)

OTHER PUBLICATIONS

PCT International Search Report issued for International application No. PCT/CN2018/109263—dated Jul. 10, 2019.
(Continued)

*Primary Examiner* — Dominic E Rego
(74) *Attorney, Agent, or Firm* — Baker Botts, LLP (57) ABSTRACT There is provided mechanisms for determining average total transmission power for an antenna array configured for beamformed transmission within an angular coverage region. A method is performed by a control device. The method comprises determining bin-wise values of beamforming gain for a set of non-overlapping bins collectively covering the angular coverage region of the antenna array. The method comprises obtaining values of total transmission power of the beamformed transmission. The method comprises determining bin-wise values of average transmission power from the bin-wise values of beamforming gain and the values of total transmission power. The method comprises combining the bin-wise values of average transmission power into one value of average total transmission power for the antenna array.

14 Claims, 7 Drawing Sheets

(51) Int. Cl.
*H04B 7/0452* (2017.01)
*H04W 52/22* (2009.01)

(56) References Cited

U.S. PATENT DOCUMENTS

| | | | |
|---|---|---|---|
| 2008/0117961 A1* | 5/2008 | Han | H04B 7/0617 375/299 |
| 2008/0188186 A1 | 8/2008 | Hwang et al. | |
| 2011/0170711 A1* | 7/2011 | Rettelbach | G10L 19/008 381/98 |
| 2014/0126745 A1* | 5/2014 | Dickins | G10L 21/0208 381/94.3 |
| 2017/0117950 A1 | 4/2017 | Strong | |
| 2017/0170928 A1* | 6/2017 | Liu | H04B 17/26 |
| 2017/0181010 A1* | 6/2017 | Burgess | H04W 72/12 |

FOREIGN PATENT DOCUMENTS

| | | |
|---|---|---|
| CN | 101878595 A | 11/2010 |
| EP | 3 771 316 | 2/2021 |

OTHER PUBLICATIONS

PCT Written Opinion of the International Searching Authority issued for International application No. PCT/CN2018/109263—dated Jul. 10, 2019.
Extended European Search Report issued for Application No. / Patent No. 18936529.9—1206 / 3864762 PCT/CN2018109263—dated May 12, 2022.
3GPP TSG RAN WG1 meeting #43; Seoul, South Korea; Source: Fujitsu; Title: Multi-beam MIMO for EUTRA Downlink (R1-051438)—Nov. 7-11, 2005.

* cited by examiner

TRANSMISSION POWER DETERMINATION FOR AN ANTENNA ARRAY

PRIORITY

This nonprovisional application is a U.S. National Stage Filing under 35 U.S.C. § 371 of International Patent Application Serial No. PCT/CN2018/109263 filed Oct. 8, 2018 and entitled "Transmission Power Determination for an Antenna Array" which is hereby incorporated by reference in its entirety.

TECHNICAL FIELD

Embodiments presented herein relate to a method, a control device, a computer program, and a computer program product for determining average total transmission power for an antenna array configured for beamformed transmission within an angular coverage region.

BACKGROUND

When any radio equipment is to be deployed, regulatory radio frequency (RF) electromagnetic field (EMF) exposure requirements should be accounted for.

These RF EMF exposure regulations may typically be based on international guidelines and standards from for example the International Commission on Non-Ionizing Radiation Protection (ICNIRP) but may take different forms in some countries and regions. An aim of the RF EMF exposure regulations is to secure that the human exposure to RF energy is kept within prescribed limits, which typically have been set with wide safety margins.

Some newly developed base stations and other radio equipment are equipped with so-called advanced antenna systems (AAS). These antenna systems increase the capacity and/or coverage compared to traditionally used antenna system by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS systems with a large number of transmitters in order to achieve a high directivity, when emissions are correlated between the transmitters then there could be a large beamforming gain. A consequence of increasing beamforming gain is that the radiated energy is concentrated in directional beams, in which the Equivalent Isotropic Radiated Power (EIRP), i.e. the power radiated from an antenna with unity antenna gain in all directions, is increased as compared to the situation without AAS systems.

The RF EMF exposure limits are typically expressed in terms of power density (in units of W/m$^2$) which in the far field is proportional to the EIRP. Consequently, the EIRP can be used to determine the power density in the far field. This implies that the experienced momentary EIRP, and the resulting power density at a given distance from the antenna, will be higher in a beam generated by an AAS system with beam forming gain, than without such an AAS system.

The ICNIRP and other RF EMF exposure limitations are commonly expressed as an average power density over a specified time interval T. This means that the momentary power density can be significantly higher during a shorter time than T, however the time-averaged power density over any time period T must be below the specified limit. To maintain a certain RF EMF exposure compliance distance (or boundary), that is shorter (or smaller) than what is obtained using the maximum EIRP of the AAS, the time-averaged power needs to be maintained at or below a pre-determined threshold or a set of pre-defines thresholds for different beam directions.

Hence, there may be a need for efficient control of the average transmitted power for base stations and other radio equipment.

SUMMARY

An object of embodiments herein is to provide efficient determination of power for base stations and other radio equipment.

This objective is generally solved by mechanisms performed by a control device for determining average total transmission power for an antenna array configured for beamformed transmission within an angular coverage region.

According to a first aspect there is presented a method for determining average total transmission power for an antenna array configured for beamformed transmission within an angular coverage region. The method is performed by a control device. The method comprises determining bin-wise values of beamforming gain for a set of non-overlapping bins collectively covering the angular coverage region of the antenna array. The method comprises obtaining values of total transmission power of the beamformed transmission. The method comprises determining bin-wise values of average transmission power from the bin-wise values of beamforming gain and the values of total transmission power. The method comprises combining the bin-wise values of average transmission power into one value of average total transmission power for the antenna array.

According to a second aspect there is presented a control device for determining average total transmission power for an antenna array configured for beamformed transmission within an angular coverage region. The control device comprises processing circuitry. The processing circuitry is configured to cause the control device to determine bin-wise values of beamforming gain for a set of non-overlapping bins collectively covering the angular coverage region of the antenna array. The processing circuitry is configured to cause the control device to obtain values of total transmission power of the beamformed transmission. The processing circuitry is configured to cause the control device to determine bin-wise values of average transmission power from the bin-wise values of beamforming gain and the values of total transmission power. The processing circuitry is configured to cause the control device to combine the bin-wise values of average transmission power into one value of average total transmission power for the antenna array According to a third aspect there is presented a control device for determining average total transmission power for an antenna array configured for beamformed transmission within an angular coverage region.

The control device comprises a determine module configured to determine bin-wise values of beamforming gain for a set of non-overlapping bins collectively covering the angular coverage region of the antenna array. The control device comprises an obtain module configured to obtain values of total transmission power of the beamformed transmission. The control device comprises a determine module configured to determine bin-wise values of average transmission power from the bin-wise values of beamforming gain and the values of total transmission power. The control device comprises a combine module configured to combine the bin-wise values of average transmission power into one value of average total transmission power for the antenna array.

According to a fourth aspect there is presented a computer program for determining average total transmission power for an antenna array configured for beamformed transmission within an angular coverage region, the computer program comprising computer program code which, when run on a control device, causes the control device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these control devices, this computer program and this computer program product enable reduced processing and signalling for efficient determination of the average total transmission power applied to the antenna array.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
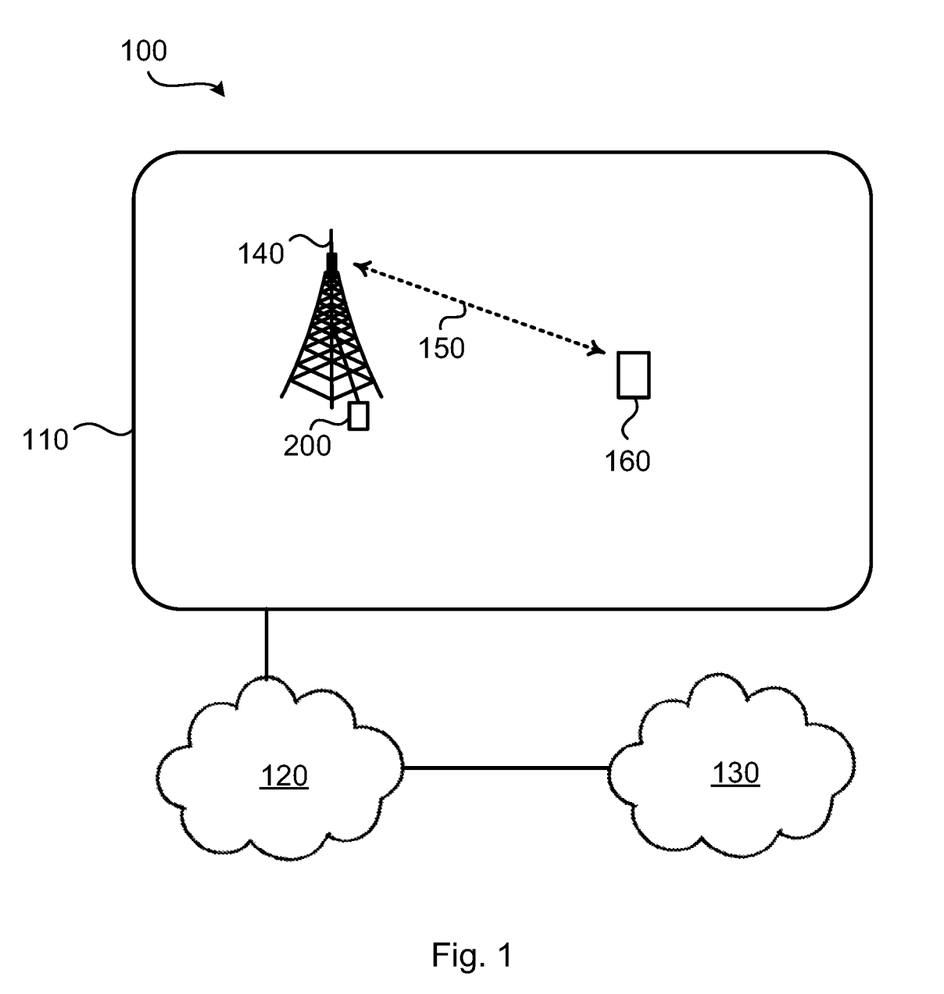
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a control node 200 configured to control an antenna array 140 of a network node that provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the network node, access services of, and exchange data with, the service network 130.

Examples of network nodes are radio access network nodes, radio base stations, base transceiver stations, Node Bs, evolved Node Bs, g Node Bs, access points, and access nodes, and backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The control node 200 might comprise, be collocated with, integrated with, or be in operational communications with, the antenna array 140 of the network node.

Figure 2:
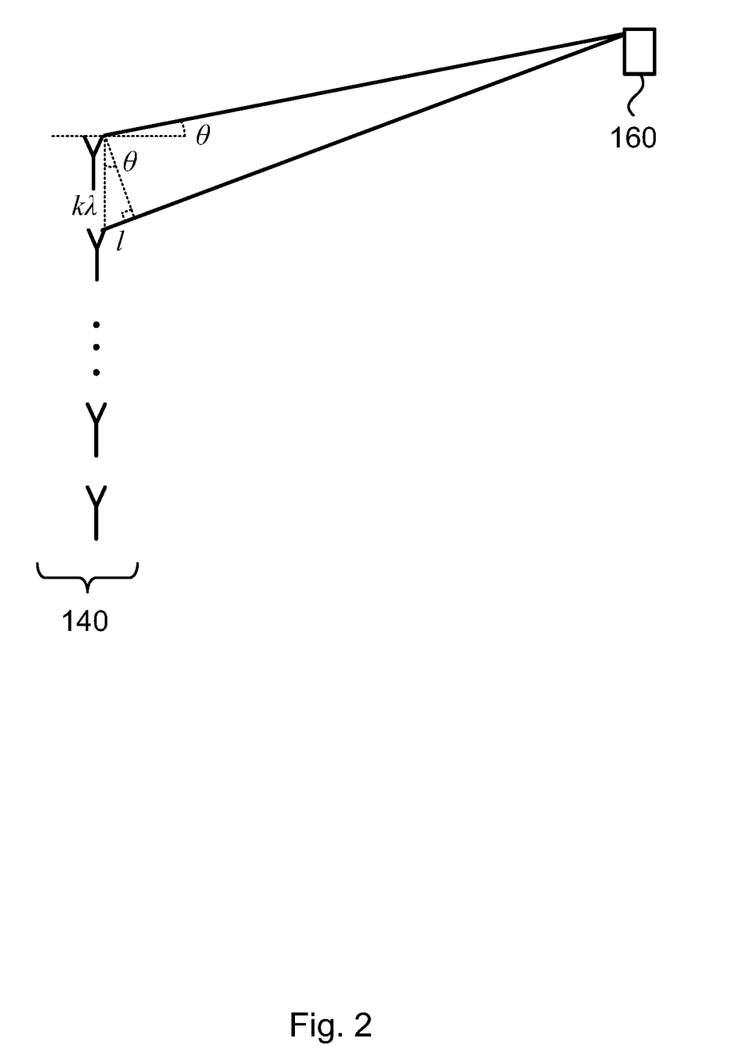
FIG. 2 schematically illustrates beamformed communication between an antenna array of a network node and a terminal device according to an embodiment.

FIG. 2 schematically illustrates an idealized one-dimensional beamforming case. In case it is assumed that the terminal device 16o is located far away from the antenna array 140, i.e. in the far-field, it follows that the difference in travel distance of radio waves from the antenna array 140 to the terminal device 16o, between adjacent antenna elements of the antenna array 140, is:

$$l = k\lambda \sin(\theta),$$

where $k\lambda$ is the antenna element separation. Here $\lambda$ is the carrier wavelength, k is the separation factor which may be 0.5-0.7 in a typical correlated antenna element arrangement. This means that if a reference signal $S_{BS}$ is transmitted from the base station, it will be received at the terminal device 160 as the signal:

$$s_{UE} = \sum_{i=1}^{N} h_i s_{BS} e^{j\omega(t-il/c)} = s_{BS} e^{j\omega t} \sum_{i=1}^{N} h_i e^{-j2\pi f_c \frac{ik\lambda \sin(\theta)}{f_c \lambda}} = s_{BS} e^{j\omega t} \sum_{i=1}^{N} h_i e^{-j2\pi ik\sin(\theta)}.$$

Here $\omega$ is the angular carrier frequency, $h_i$ is the complex channel from the i:th antenna element, t is the time index, and $f_c$ is the carrier frequency. In the above equation $\theta$ and $h_i$ are unknown. In case of a feedback solution, the UE therefore needs to search for all complex channel coefficients $h_i$ and the unknown angle $\theta$. For this reason, the standard defines a codebook of beams in different directions given by steering vector coefficients like $$w_{m,i} = e^{-jf(m,i)},$$

where m indicates a directional codebook entry. The terminal device 160 then tests each codebook and estimates the channel coefficients. The information rate achieved for each codebook entry m is computed and the best one defines the direction and channel coefficients. This is possible since the pilot signal transmitted from the network node of the antenna array 140 is a known signal at the receiver. The result is encoded and reported back to the network node. This provides the base station with a best direction (codebook entry) and information that allows it to build up a channel matrix H. This matrix represents the channel from each of the transmit antenna elements to each of the receive antenna elements. Typically, each element of H is represented by a complex number.

The fed back information is denoted CSI, for Channel State Information, and consists of CQI (Channel Quality Indication), a quantity directly related to the received signal to noise ratio, the PMI (Pre-code Matrix Index) which is the codebook entry, and the RI (Rank Indication) which expresses the richness of the channel which essentially tells how many parallel MIMO channels that can be sustained between the transmitter and receiver at the specific frequency.

The channel matrix H can then be used for beamforming computations, or the direction represented by the reported codebook entry can be used directly.

To exploit reciprocity, the channel coefficients can be directly estimated by the network node from uplink transmission of known pilot signals (for example so called sounding reference signals, SRSs) from the terminal device 160. These signals are available in both the 4G and 5G standards. The estimated channel can then be used to compute the combining weight matrix with a selected principle, and then used for downlink transmission. This works since the uplink and downlink channels are the same (to within a transpose) when reciprocity is valid.

As mentioned above there is a need for efficient determination of power for base stations and other radio equipment.

One drawback of current mechanisms for limiting the AAS time-averaged radiated power for RF EMF exposure regulation compliance is the current lack of a dynamic and at the same time smooth limitation of scheduled resources in the scheduler, where the limitation is dependent on multiple averaged output power measurements.

Another drawback of current mechanisms for limiting the AAS time-averaged radiated power for RF EMF exposure regulation compliance is the current lack of a feedback control mechanism that controls the actuator mechanism with a control signal computed from the multiple averaged powers and a reference value, where the multiple averaged power is dependent on beamforming gains computed from either precoder matrix indices of so-called codebook based beamforming, where the beamforming gains is precomputed and stored, or where the averaged power is dependent on beamforming gains computed from beamforming weights generated by the solutions to a reciprocity based optimization problem.

The embodiments disclosed herein therefore relate to mechanisms for determining average total transmission power for an antenna array 140 configured for beamformed transmission within an angular coverage region. In order to obtain such mechanisms there is provided a control device 200, a method performed by the control device 200, a computer program product comprising code, for example in the form of a computer program, that when run on a control device 200, causes the control device 200 to perform the method.

Figure 3:
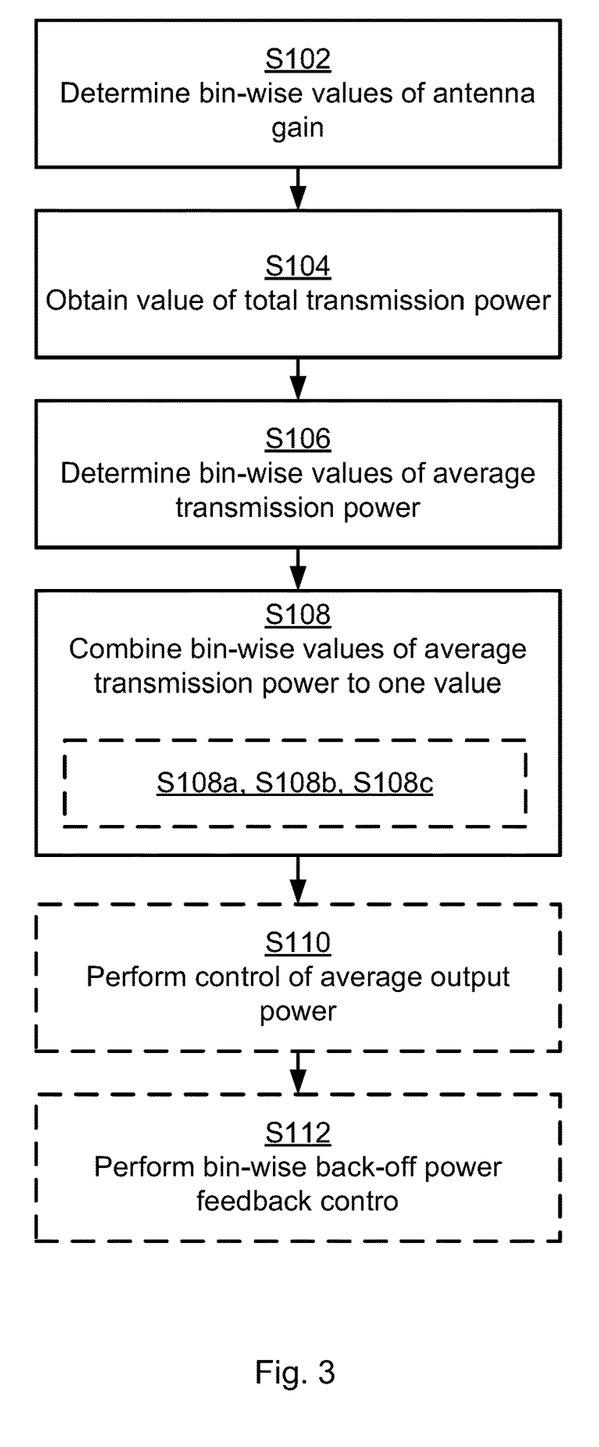
FIG. 3 is a flowchart of methods according to embodiments.

FIG. 3 is a flowchart illustrating embodiments of methods for determining average total transmission power for an antenna array 140 configured for beamformed transmission within an angular coverage region. The methods are performed by the control device 200. The methods are advantageously provided as computer programs 920.

S102: The control node 200 determines bin-wise values of beamforming gain for a set of non-overlapping bins collectively covering the angular coverage region of the antenna array 140.

In this respect, each bin might thus correspond to a angle interval, where each bin is (approximately) defined by the following selection of ranges in azimuth angle ($\theta$) and elevation angle ($\varphi$): $\Omega_{i,j} = [\theta_i, \theta_{i+1}] \times [\varphi_j, \varphi_{j+1}]$, i=0, ..., N−1, and j=0, ..., M−1, where N represents the number of bins in azimuth direction and M represents the number of bins in elevation direction.

S104: The control node 200 obtains values of total transmission power of the beamformed transmission. The values are obtained over time such that one value is obtained at time index t.

S106: The control node 200 determines bin-wise values of average transmission power from the bin-wise values of beamforming gain and the values of total transmission power.

S108: The control node 200 combines the bin-wise values of average transmission power into one value of average total transmission power for the antenna array 140.

This yields an efficient way to assess the time-averaged radiated power in a certain direction, valid for codebook based beamforming as well as for reciprocity assisted transmission. Below it will be disclosed how this can be integrated into a feedback control system, that is designed to control the RF emissions.

Embodiments relating to further details of determining average total transmission power for an antenna array 140 configured for beamformed transmission within an angular coverage region as performed by the control device 200 will now be disclosed.

In the following the following notation and definitions will be helpful. The steering vector with index i,j is denoted $\alpha^{i,j}$ and is representative of the direction in azimuth and elevation for the bin with index i,j. The beamforming weights multi-user group $n_g$ are denoted $w_{0,n_g}$, $w_{1,n_g}$, ..., $w_{n_v,n_g}$, ..., $w_{N_w-1,n_g}$, where the number of beamforming weights for multi-user group $n_g$ is denoted $N_{w,n_g}$. These beamforming weights can be generated in any way, e.g. by codebook based beamforming or by the solution of a reciprocity assisted transmission optimization problem. The number of multi-user groups is denoted $N_g$. These quantities are valid for a certain point in time, e.g. a transmission time index (TTI).

There may be different ways to obtain the values of total transmission power $P_{tot}(t)$.

In some aspect the values of total transmission power $P_{tot}(t)$ are measured. Particularly, according to an embodiment the values of total transmission power are measured at input to the antenna array 140. In this respect, the total output power of an antenna array 140, over all antenna elements of the antenna array 140, can be measured in the radio equipment, just before the antenna elements. In some examples this can be done by couplers that measure the radio signal amplitude at each signal path to an antenna element. These amplitudes can then be combined into a total output power of the radio equipment, with the antenna gain removed. This quantity is denoted $P_{tot}(t)$.

In other aspects the values of total transmission power $P_{tot}(t)$ are predicted. For example, the values of total transmission power $P_{tot}(t)$ can be predicted using information available in the scheduler or elsewhere in baseband. Such a quantity could be obtained, e.g. by summing up the momentary scheduled power as estimated by the fraction of resources used at each time instant t, over the time T.

There may be different ways to obtain the bin-wise values of beamforming gain.

In some aspects the bin-wise values of beamforming gain are based on the steering vectors and the beamforming weights. Particularly, according to an embodiment each of the bins is associated with a respective bin-wise steering vector representing a direction of the beamformed transmission and a respective bin-wise beamforming weight of its steering vector. The bin-wise values of beamforming gain are then proportional the squared norm of the bin-wise steering vector and the bin-wise beamforming weight. In some examples the bin-wise values of beamforming gain are then proportional to the squared norm of the bin-wise steering vector and the bin-wise beamforming weight.

In some aspects the bin-wise values of beamforming gain are based on the fraction $$\frac{\eta_{n_g}(t)}{\eta_{max}}$$

of transmission resources $\eta$ used by multi-user group $n_g$. In some examples each transmission resource is defined by a physical resource block (PRB).

According to an embodiment a respective fraction of transmission resources is transmitted per time unit during the beamformed transmission. All fractions of transmission resources collectively form a total amount of resources, and the bin-wise values of beamforming gain are proportional to the fraction of transmitted transmission resources.

Let $Gain_{i,j}(t)$ denote the bin-wise value of the beamforming gain for the bin with indices i,j at time index t and let $P_{tot}(t)$ denote the value of total transmission power at time index t.

Then, according to an embodiment, when the beamformed transmission is to $N_g$ multi-user groups $n_g$, the bin-wise value of the beamforming gain $Gain_{i,j}(t)$ for the bin with indices i,j is determined as:

$$Gain_{i,j}(t) = \sum_{n_g=0}^{N_g-1} \sum_{n_w=0}^{N_w-1} v_{i,j,n_w,n_g}(t) \frac{\eta_{n_g}(t)}{\eta_{max}},$$

where $v_{i,j,n_w,n_g}(t)$ represents a combination of steering vector $\alpha^{i,j}(t)$ and beamforming weight $w_{n_w,n_g}(t)$ for beam $n_w$ of multi-user group $n_g$ at time index t, and where $$\frac{\eta_{n_g}(t)}{\eta_{max}}$$

is the fraction of transmission resources used by multi-user group $n_g$ at time index t.

In some aspects the beamforming gains, as denoted $G_{0,n_g}$, $G_{1,n_g}, \ldots, G_{n_w,n_g}, \ldots, G_{N_w-1,n_g}$, are available. In other words, there are $N_{w,n_g}$ possible beamforming gains available. This is a typical situation when codebook based beamforming is used, e.g., to operate a grid of beams beamforming at the antenna array 140. However, it may be applied for reciprocity assisted transmission beamforming as well. In such cases, $v_{i,j,n_w,n_g}(t)$ can be determined according to:

$$v_{i,j,n_w,n_g}(t) = \frac{\|(\alpha^{i,j}(t))^H w_{n_w,n_g}(t)\|^2}{\|(w_{n_w,n_g}(t))^H w_{n_w,n_g}(t)\|^2} G_{n_w,n_g}(t),$$

where $G_{n_w,n_g}(t)$ represents a power ratio between a user beam and a common beam used during the beamformed transmission. That is, $$G_{n_w,n_g}(t) = \frac{\tilde{P}_b(t)}{\tilde{P}_c(t)}$$

is expressing the power ratio between a user beam and the common (control channel) beam. Both codebook based beamformed transmission and reciprocity assisted transmission based beamformed transmission can have the power ratio calculated, but it is mostly used for codebook based beamformed transmission.

In some aspects the beamforming gains are not available. This is a typical situation when reciprocity assisted transmission is applied, however it may be applied for codebook-based beamforming as well. In such cases, $v_{i,j,n_w,n_g}(t)$ can be determined according to:

$$v_{i,j,n_w,n_g}(t) = \|(\alpha^{i,j}(t))^H w_{n_w,n_g}(t)\|^2.$$

It is evident that an estimate of the total average power in direction i,j is composed of the main lobe transmission to users in direction i,j, and the sidelobe transmissions for users in all other directions. Fortunately, all these effects are captured by the summation employed to compute $Gain_{i,j,casex}(t)$, where $x \in \{1, 2\}$. This means that the equivalent radio power contributing in direction i,j becomes:

$$\langle P_{tot}\rangle_{i,j}(t) = \frac{1}{T}\int_{t-T}^{t} \frac{Gain_{i,j,casex}(\tau)}{G_{max}} P_{tot}(\tau) d\tau = \frac{1}{T}\int_{t-T}^{t} K_{i,j}(\tau) P_{tot}(\tau) d\tau.$$

In this equation $\langle P_{tot}\rangle_{i,j}(t)$ is the average power quantity for direction i,j, and $P_{tot}(t)$ is obtained as disclosed above. This means that all quantities are transformed back to relate to the maximum radiated power in one single direction. When a single user exploits all resources and applies the maximum gain of the antenna array, the above equation collapses to the average of $P_{tot}(t)$, as desired. It is here noted that the above expression can be discretized and hence that the integral in the above equation can be substituted by a summation. When implemented with computer control, discretization can be done e.g. with the Euler approximation or with the so called Tustin approximation. These techniques are as such well known in the art.

When only one total average power is to be controlled, the directional average powers $\langle P_{tot}\rangle_{i,j}(t)$ needs to be combined. One way to achieve this is to take:

$$\langle P_{tot}\rangle(t) = \max_{i,j}(\langle P_{tot}\rangle_{i,j}(t)).$$

Hence, according to an embodiment the control node 200 is configured to perform (optional) step S108a as part of step S108:

S108a: The control node 200 determines the maximum value of all the bin-wise values of average transmission power when combining the bin-wise values of average transmission power into one value of average total transmission power for the antenna array 140.

Since the estimates of the directional angular powers are all likely to be lower than an averaged power valid for the whole cell, it is likely that also the combined total power will be less than an averaged power directly averaged over the whole cell. A gain can therefore be expected to that case. A less conservative, but also less stringent combination would be to use.

Another way to achieve this is to take:

$$\langle P_{tot}\rangle(t) = \text{average}_{i,j}(\langle P_{tot}\rangle_{i,j}(t)).$$

Hence, according to an embodiment the control node 200 is configured to perform (optional) step S108b as part of step S108:

S108b: The control node 200 determines an average value of all the bin-wise values of average transmission power when combining the bin-wise values of average transmission power into one value of average total transmission power for the antenna array 140.

Yet another way to achieve this is to take:

$$\langle P_{tot}\rangle(t) = \text{median}_{i,j}(\langle P_{tot}\rangle_{i,j}(t)).$$

Hence, according to an embodiment the control node 200 is configured to perform (optional) step S108c as part of step S108:

S108c: The control node 200 determines a median value of all the bin-wise values of average transmission power when combining the bin-wise values of average transmission power into one value of average total transmission power for the antenna array 140.

Still further combinations are possible.

In some aspects the average output power applied to the antenna array 140 is limited. Particularly, according to an embodiment the average output power applied to the antenna array 140 is limited by a resource factor value $\gamma(t)$. In more detail, in order to get a smooth behavior of the limiting resource threshold applied in the scheduler to limit the averaged output power, it might be rate controlled. That means that the control signal commands adjustments to the limiter, making it increase or decrease, typically in small steps. The dynamics of the actuator mechanism might therefore be determined to be:

$$\dot{\gamma}(t) = u(t),$$

where $\gamma(t)$ is the resource threshold and where u(t) is the control signal further discussed below. The resource threshold is decoupled from the scheduler algorithms themselves, and just expresses a fractional limitation of the scheduler not to use more than a fraction $\gamma(t)$ of its total resources. The scheduler may then limit the number of transmission resources it uses, or limit any other quantity that correlates well with the momentary output power.

In some aspects the resource factor value $\gamma(t)$ is set to its minimum value when the value of average total transmission power is larger than a power threshold value. In more detail, the maximum value of $\gamma(t)$ is 1 since it is to express a fraction of the maximum amount of scheduler resources. There might also be a need to limit its lower value in order to avoid that the dynamic feedback control mechanism reduces it to an unphysical value below 0. The following scheduler threshold limitation might therefore be applied:

$$\gamma_{low} \leq \gamma(t) \leq 1.$$

In some aspects cell-wide control of average output power of the antenna array 140 is performed based on the average total transmission power. Hence, according to an embodiment the control node 200 is configured to perform (optional) step S110:

S110: The control node 200 performs cell-wide control of average output power of the antenna array 140 based on the above determined one value of the average total transmission power.

In some aspects only one feedback control loop is used for this control, which reduces the complexity of the solution in the scheduler, at the same time as gains as compared to a cell-wide assessment of the averaged power are obtained. Hence, according to an embodiment the control node 200 is configured to perform (optional) step S112:

S112: The control node 200 performs cell-wide back-off power feedback control based on the bin-wise values of average transmission power.

In some aspects a setpoint is used for the averaged power. Particularly, according to an embodiment, performing the control in step S110 comprises to compare the value of average total transmission power to a setpoint value $\langle P_{tot}\rangle^{ref}$ of the average total transmission power.

There could be different types of controllers used in step S110.

In some aspects the controller is of proportional-derivative (PD) type. That is, according to an embodiment the control in step S110 (and S112) is of PD type.

In some aspects the controller is of derivative (D) type. That is, according to an embodiment the control in step S110 (and S112) is of D type. Thus, in some aspects only differential control is allowed.

In some aspects a supervision mechanism is employed for enabling and disabling the proposed actuator and feedback control mechanisms. That is, according to an embodiment the control in step S110 (and S112) is selectively enabled and disabled. Further, the resource factor value $\gamma(t)$ might be set to its maximum value when performing the control is enabled.

There could be different ways to determine when to enable and disable the control. In some aspects a comparison to threshold values is made in order to determine when to enable and disable the control. In particular, according to an embodiment, performing the control (as in step S110) is enabled when the determined one value of the average total transmission power is larger than a fractional first power threshold value $\delta_1$, and performing the control is disabled when the determined one value of the average total transmission power is smaller than a second fractional power threshold value $\delta_2$, where $\delta_2 \leq \delta_1$. In more detail, one scope of the thus proposed actuator and feedback control mechanisms is to control the averaged output power, to be below the regulatory requirement. When this is not needed, these mechanisms could be disabled, leaving the radio equipment to operate with out any scheduler limitation. Therefore, according to an example: 1) Enable the actuator and feedback control mechanisms when $\langle P_{tot}\rangle(t) > \delta_1 P_{max,site}$, and set $\gamma(t) = 1$, and 2) Disable the actuator and feedback control mechanisms when $\langle P_{tot}\rangle(t) < \delta_2 P_{max,site}$. In some aspects the values fulfil: $\delta_2 P_{max,site} \leq \langle P_{tot}\rangle \leq \delta_1 P_{max,site}$, where $P_{max,site}$ denotes the maximum transmission power of the site comprising the site.

Figure 4:
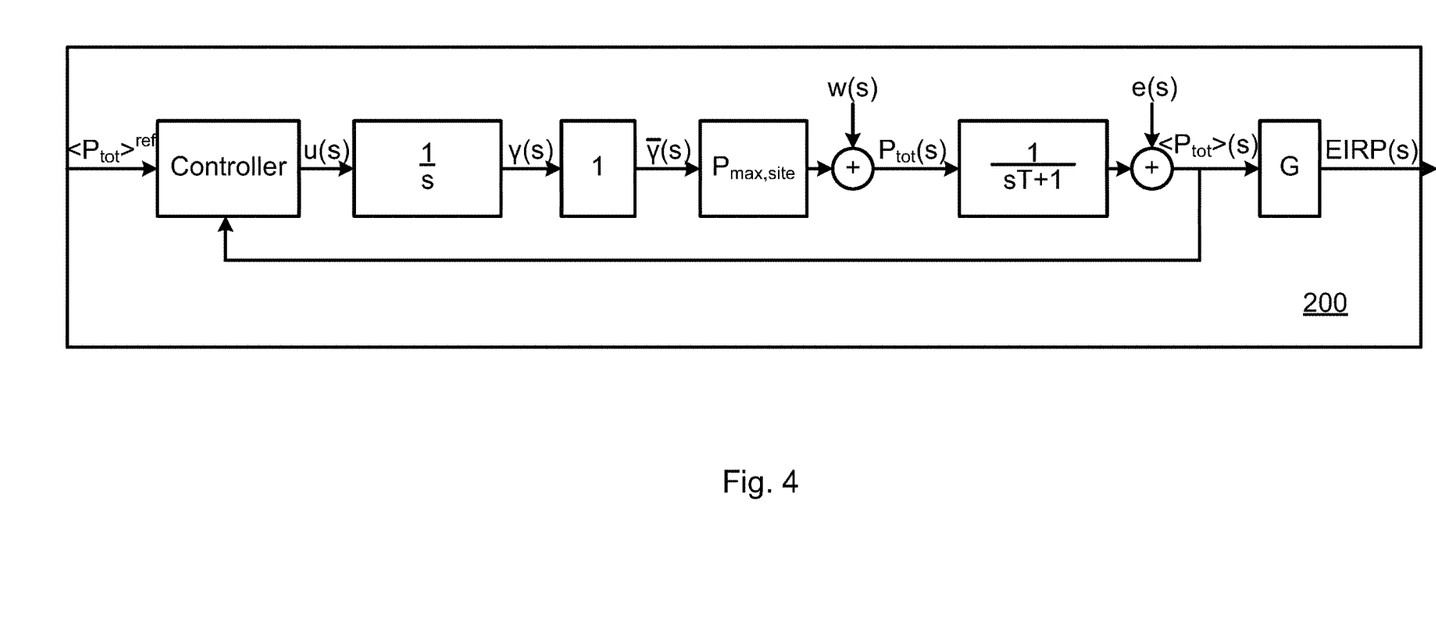
FIGS. 4, 5, 6 are block diagrams of a control device according to embodiments.

FIG. 4 is a block diagram of the control node 200 where feedback control has been enabled by the supervision mechanism. In FIG. 4, $\langle P_{tot}\rangle^{ref}$ denotes the setpoint for the averaged power (typically slightly less than the threshold value), 1/s denotes the actuator dynamics with lower and upper limits inactive, $\bar{\gamma}(t)$ denotes the scheduler limitation after lower and upper limitation (inactive in FIG. 4), $P_{max,site}$ denotes the maximal total power of the antenna array 140, w(s) denotes a disturbance representing predicted power errors, $1/(sT+1)$ represents an autoregressive simplified model of the averaging, $\langle P_{tot} \rangle (s)$ denotes the averaged total power, G denotes the antenna gain and EIRP(s) denotes the EIRP. All quantities are in FIG. 4 expressed in the Laplace transform domain, which is allowed since the feedback control mechanism design is performed with constraints inactive.

In some aspects the controller block is given by:

$$u(s)=C(1+T_D s)(\langle P_{tot}\rangle^{ref} - \langle P_{tot}\rangle(s)).$$

A control node 200 implementing this controller block is of PD type. C denotes the proportional gain, and $T_D$ the differentiation time. The poles of the closed loop system of FIG. 4 are given by the following second order equation:

$$s^2+(1/T+P_{max,site}CT_D)s+P_{max,site}C=0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as:

$$s^2+(\alpha_1+\alpha_2)s+\alpha_1\alpha_2=0.$$

An identification of coefficients and solution of the resulting system of equations reveal that the proportional gain and differentiation time shall be selected as:

$$C = \frac{\alpha_1 \alpha_2}{P_{max,site}},$$

and:

$$T_D = \frac{\alpha_1 + \alpha_2 - \frac{1}{T}}{\alpha_1 \alpha_2}.$$

One reason for this choice is that a system with two negative real poles can be expected to be well damped, which is a result of a significant differentiation action. This might be advantageous when differentiation action is needed for fast back-off close to the determined threshold.

To implement the feedback control mechanism, $\langle P_{tot}\rangle^{ref}$, $\langle P_{tot}\rangle(t)$ and $\langle \dot{P}_{tot}\rangle(t)$ are needed. The first two quantities can be obtained as described above, while the second quantity might be estimated. This can e.g. be achieved by autoregressive filtering of $\langle P_{tot}\rangle(t)$ with the filter given by:

$$\langle \dot{P}_{tot}\rangle(s) = \frac{\alpha s}{s+\alpha}\langle P_{tot}\rangle(s).$$

In order to further emphasize the back-off control performance only negative differential control action might be allowed. This could reduce the scheduler threshold $\gamma(t)$, meaning that only negative contributions from the second term of the feedback mechanism should be allowed. This means that in the time domain, the following restriction to the derivative $\langle \dot{P}_{tot}\rangle(t)$ is applied:

$$u(t)=C(\langle P_{tot}\rangle^{ref} - \langle P_{tot}\rangle(t))-CT_D \max(0, \langle \dot{P}_{tot}\rangle(t)).$$

Sometimes it may happen that the feedback control mechanism is not fast enough to prevent a small overshoot of the determined power threshold. To prevent that from happening a hard back-off is superimposed over the disclosed feedback control mechanism. This hard back-off operates by setting the scheduler threshold to its minimum value $\gamma_{low}$ whenever:

$$\langle P_{tot}\rangle(t) > \text{margin} \cdot P_{max},$$

where margin is a value slightly below 1 and where $P_{max}$ is the determined maximum average power threshold.

Figure 5:
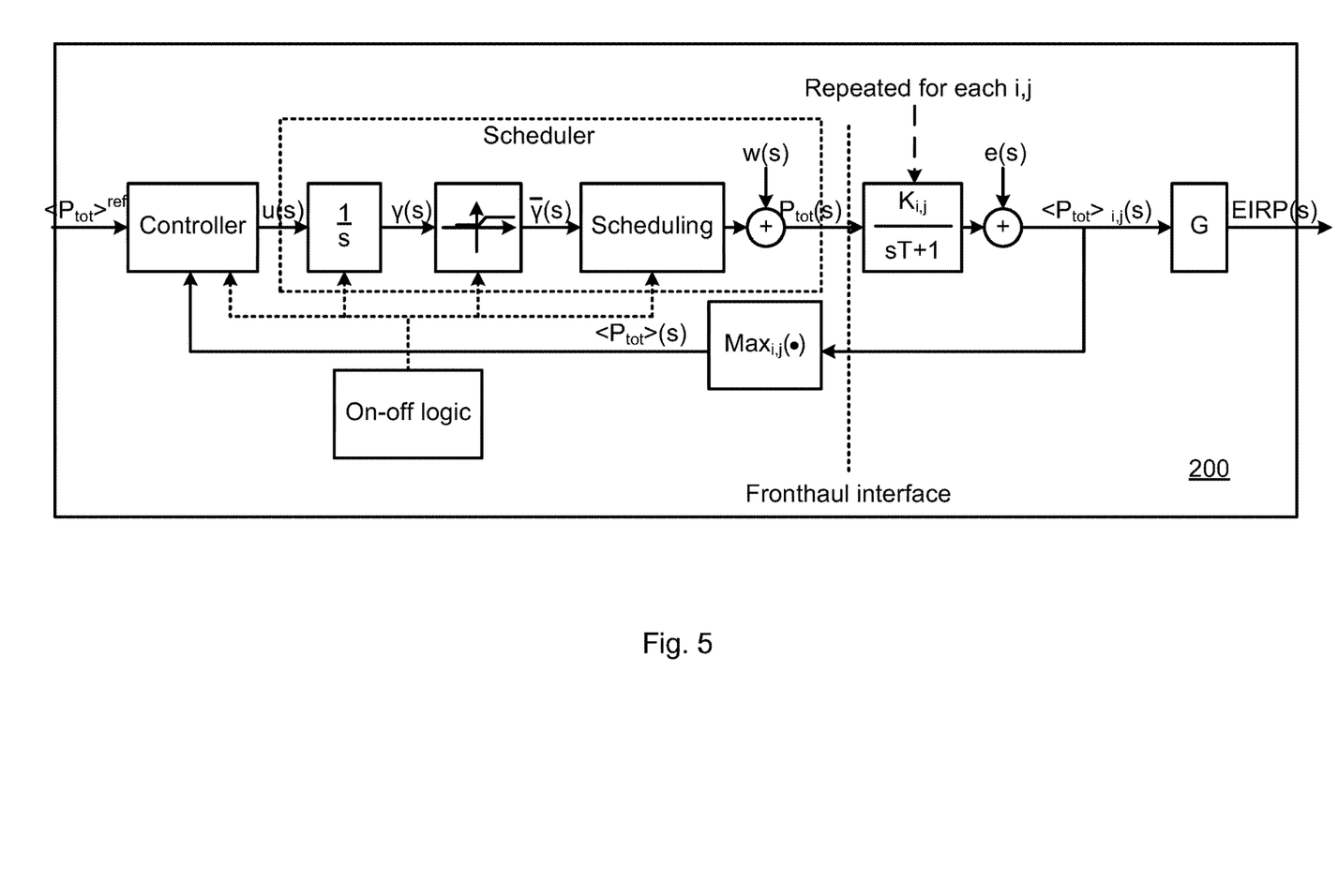
Figure 6:
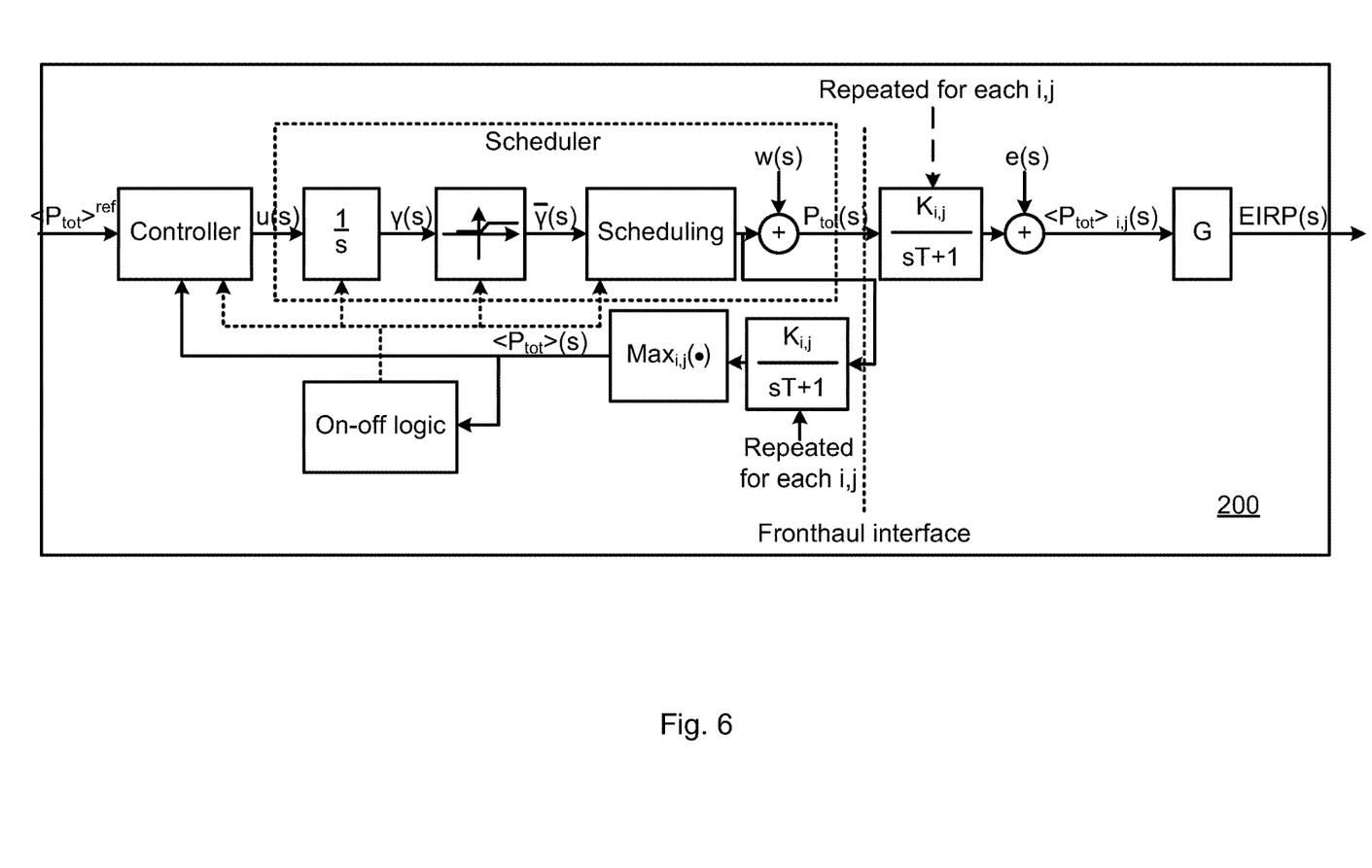

As stated above, an advantage with the present invention is that it is able to operate both with predicted and measured average power signals. This is illustrated with FIG. 5 and FIG. 6. FIG. 5 is a block diagram of an architecture of the control node 200 where measured averaged total power feedback from the AAS system of the radio is used. FIG. 6 is a block diagram of an architecture of the control node 200 where predicted averaged total power is used.

In FIGS. 5 and 6 some functional blocks are indexed with indices i,j, each indicating one of azimuth or elevation of the direction in question. As can be seen, there is in FIGS. 5 and 6 an averaging block (as in FIG. 4) where an additional quantity, denoted $K_{i,j}$, represents the reduction of the average power as compared to the case when a cell wide average power measurement is made. Thus the value of $K_{i,j}$ is nonnegative and typically less than 1. The per beam direction average powers $\langle P_{tot}\rangle_{i,j}(s)$, are then combined, e.g. by taking the maximum value over all indices i,j. In FIG. 5 the momentary measured power in the radio is the input to the average per beam direction power block. FIG. 6 illustrates an alterative where a predicted power in base band provides the input.

The remaining parts of FIGS. 5 and 6 are common. When activated, the resulting average total average power $\langle P_{tot}\rangle(s)$ is sent to the controller block, where in one example PD control is applied to the control error formed by $\langle P_{tot}\rangle(s)$ and the reference value $\langle P_{tot}\rangle(s)^{ref}$, thereby generating the control signal u(s). The control signal affects the dynamic threshold in the scheduler, represented by the integration 1/s. To secure that the relative dynamic threshold stays between $\gamma_{low}$ and 1, the limiting block transforms $\gamma(t)$ to the final relative dynamic threshold $\bar{\gamma}(t)$. The scheduler then performs data traffic scheduling, accounting for $\bar{\gamma}(t)$, thereby producing the data transmission which closes the loop.

In FIGS. 5 and 6 there is a block denoted on-off logic. The on-off logic is configured to make sure that the control loop is disabled when not needed and enabled when needed. In one example this is implemented using two relative thresholds, $\delta_1$ and $\delta_2$, that 1) enables the actuator and feedback control mechanisms when $\langle P_{tot}\rangle(t) > \delta_1 P_{max,site}$, and sets $\gamma(t)=1$, and 2) disables the actuator and feedback control mechanisms when $\langle P_{tot}\rangle(t) < \delta_2 P_{max,site}$. In some aspects the values fulfil: $\delta_2 P_{max,site} \leq \langle P_{tot}\rangle^{ref} \leq \delta_1 P_{max,site}$, where $P_{max,site}$ denotes the maximum transmission power of the site.

Figure 7:
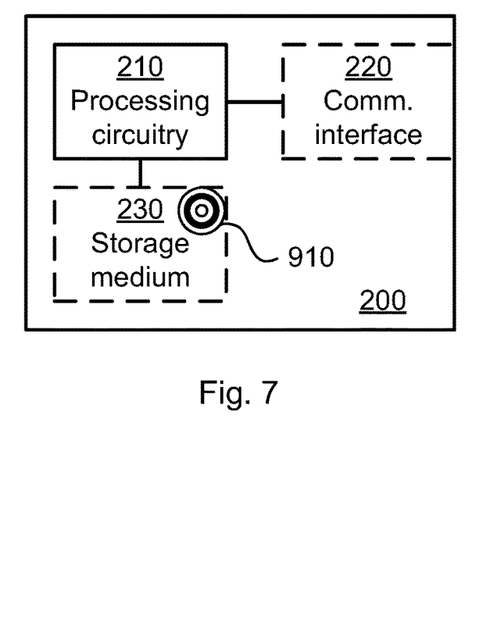
FIG. 7 is a schematic diagram showing functional units of a control device according to an embodiment.

FIG. 7 schematically illustrates, in terms of a number of functional units, the components of a control device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the control device 200 to perform a set of operations, or steps, as disclosed above. For example, the storage medium 230 may store the set of operations, and the processing circuitry 210 may be configured to retrieve the set of operations from the storage medium 230 to cause the control device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 200 may further comprise a communications interface 220 at least configured for communications with other entities, nodes, functions, and devices. As such the communications interface 220 may comprise one or more transmitters and receivers, comprising analogue and digital components. The processing circuitry 210 controls the general operation of the control device 200 e.g. by sending data and control signals to the communications interface 220 and the storage medium 230, by receiving data and reports from the communications interface 220, and by retrieving data and instructions from the storage medium 230. Other components, as well as the related functionality, of the control device 200 are omitted in order not to obscure the concepts presented herein.

Figure 8:
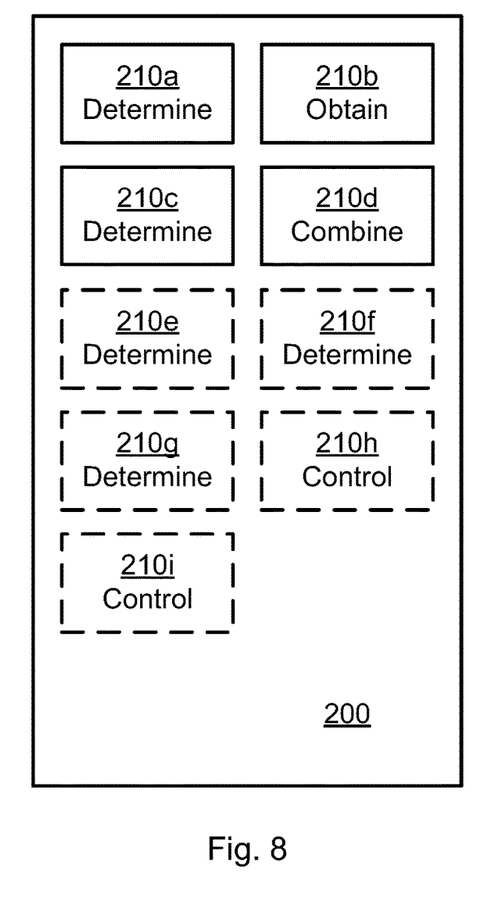
FIG. 8 is a schematic diagram showing functional modules of a control device according to an embodiment.

FIG. 8 schematically illustrates, in terms of a number of functional modules, the components of a control device 200 according to an embodiment. The control device 200 of FIG. 8 comprises a number of functional modules; a determine module 210a configured to perform step S102, an obtain module 210b configured to perform step S104, a determine module 210c configured to perform step S106, and a combine module 210d configured to perform step S108. The control device 200 of FIG. 8 may further comprise a number of optional functional modules, such as any of a determine module 210e configured to perform step S108a, a determine module 210f configured to perform step S108b, a determine module 210g configured to perform step S108c, a control module 210h configured to perform step S110, and a control module 210i configured to perform step S112.

In general terms, each functional module 210a-210i may in one embodiment be implemented only in hardware and in another embodiment with the help of software, i.e., the latter embodiment having computer program instructions stored on the storage medium 230 which when run on the processing circuitry makes the control device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210i may be implemented by the processing circuitry 210, possibly in cooperation with the communications interface 220 and/or the storage medium 230. The processing circuitry 210 may thus be configured to from the storage medium 230 fetch instructions as provided by a functional module 210a-210i and to execute these instructions, thereby performing any steps as disclosed herein.

The control device 200 may be provided as a standalone device or as a part of at least one further device. For example, the control device 200 may be provided in a node of the radio access network or in a node of the core network. Alternatively, functionality of the control device 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the control device 200 may reside in the radio access network, such as in the radio access network node, for cases when embodiments as disclosed herein are performed in real time.

Thus, a first portion of the instructions performed by the control device 200 may be executed in a first device, and a second portion of the of the instructions performed by the control device 200 may be executed in a second device; the herein disclosed embodiments are not limited to any particular number of devices on which the instructions performed by the control device 200 may be executed. Hence, the methods according to the herein disclosed embodiments are suitable to be performed by a control device 200 residing in a cloud computational environment. Therefore, although a single processing circuitry 210 is illustrated in FIG. 7 the processing circuitry 210 may be distributed among a plurality of devices, or nodes. The same applies to the functional modules 210a-210i of FIG. 8 and the computer program 920 of FIG. 9 (see below).

Figure 9:
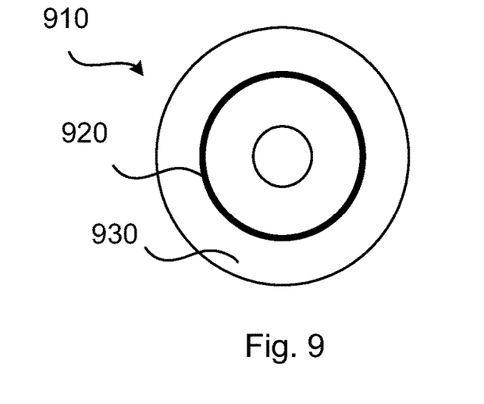
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining average total transmission power for an antenna array configured for beamformed transmission within an angular coverage region, the method being performed by a control device, the method comprising:

determining bin-wise values of beamforming gain for a set of non-overlapping bins collectively covering the angular coverage region of the antenna array;

obtaining values of total transmission power of the beamformed transmission;

determining bin-wise values of average transmission power from the bin-wise values of beamforming gain and the values of total transmission power; and combining the bin-wise values of average transmission power into one value of average total transmission power for the antenna array.

2. The method according to claim 1, further comprising:

performing cell-wide control of average output power of the antenna array based on said one value of the average total transmission power.

3. The method according to claim 1, wherein the values of total transmission power are measured at input to the antenna array.

4. The method according to claim 1, wherein the values of total transmission power are predicted.

5. The method according to claim 1, wherein each of the bins is associated with a respective bin-wise steering vector representing a direction of the beamformed transmission and a respective bin-wise beamforming weight of its steering vector, and wherein the bin-wise values of beamforming gain are proportional to the squared norm of the bin-wise steering vector and the bin-wise beamforming weight.

6. The method according to claim 5, wherein the beamformed transmission is to $N_g$ multi-user groups $n_g$, wherein the bin-wise value of the beamforming gain $Gain_{i,j}(t)$ for the bin with indices i,j is determined as:

$$Gain_{i,j}(t) = \sum_{n_g=0}^{N_g-1} \sum_{n_w=0}^{N_w-1} v_{i,j,n_w,n_g}(t) \frac{\eta_{n_g}(t)}{\eta_{max}},$$

where $v_{i,j,n_w,n_g}(t)$ represents a combination of steering vector $\alpha^{i,j}(t)$ and beamforming weight $w_{n_w,n_g}(t)$ for beam $n_w$ of multi-user group $n_g$ at time index t, and where $$\frac{\eta_{n_g}(t)}{\eta_{max}}$$

is the fraction of transmission resources used by multi-user group $n_g$ at time index t.

7. The method according to claim 6, wherein $v_{i,j,n_w,n_g}(t)$ is determined according to:

$$v_{i,j,n_w,n_g}(t) = \frac{\left\|(\alpha^{i,j}(t))^H w_{n_w,n_g}(t)\right\|^2}{\left\|(w_{n_w,n_g}(t))^H w_{n_w,n_g}(t)\right\|^2} G_{n_w,n_g}(t),$$

where $G_{n_w,n_g}(t)$ represents a power ratio between a user beam and a common beam used during the beamformed transmission.

8. The method according to claim 6, wherein $v_{i,j,n_w,n_g}(t)$ is determined according to:

$$v_{i,j,n_w,n_g}(t) = \left\|(\alpha^{i,j}(t))^H w_{n_w,n_g}(t)\right\|^2.$$

9. The method according to claim 1, wherein a respective fraction of transmission resources is transmitted per time unit during the beamformed transmission, where all fractions of transmission resources collectively form a total amount of resources, and wherein the bin-wise values of beamforming gain are proportional to the fraction of transmitted transmission resources.

10. The method according to claim 9, wherein each transmission resource is defined by a physical resource block, PRB.

11. The method according to claim 1, wherein $Gain_{i,j}(t)$ denotes the bin-wise value of the beamforming gain for the bin with indices i,j at time index t and where $P_{tot}(t)$ denotes the value of total transmission power at time index t.

12. The method according to claim 1, wherein combining the bin-wise values of average transmission power into one value of average total transmission power for the antenna array comprises any of:

determining the maximum value of all the bin-wise values of average transmission power;

determining an average value of all the bin-wise values of average transmission power; or determining a median value of all the bin-wise values of average transmission power.

13. A control device for determining average total transmission power for an antenna array configured for beamformed transmission within an angular coverage region, the control device comprising processing circuitry, the processing circuitry being configured to cause the control device to:

determine bin-wise values of beamforming gain for a set of non-overlapping bins collectively covering the angular coverage region of the antenna array;

obtain values of total transmission power of the beamformed transmission;

determine bin-wise values of average transmission power from the bin-wise values of beamforming gain and the values of total transmission power; and combine the bin-wise values of average transmission power into one value of average total transmission power for the antenna array.

14. A computer program product for determining average total transmission power for an antenna array configured for beamformed transmission within an angular coverage region, the computer program product comprising non-transitory computer readable storage medium having program instructions embodied therewith, when executed on processing circuitry of a control device, causes the control device to:

determine bin-wise values of beamforming gain for a set of non-overlapping bins collectively covering the angular coverage region of the antenna array;

obtain values of total transmission power of the beamformed transmission;

determine bin-wise values of average transmission power from the bin-wise values of beamforming gain and the values of total transmission power; and combine the bin-wise values of average transmission power into one value of average total transmission power for the antenna array.

* * * * *